April 17, 1962 F. C. POLANSKI 3,030,135
WORK HOLDERS
Filed Oct. 13, 1958 2 Sheets-Sheet 1
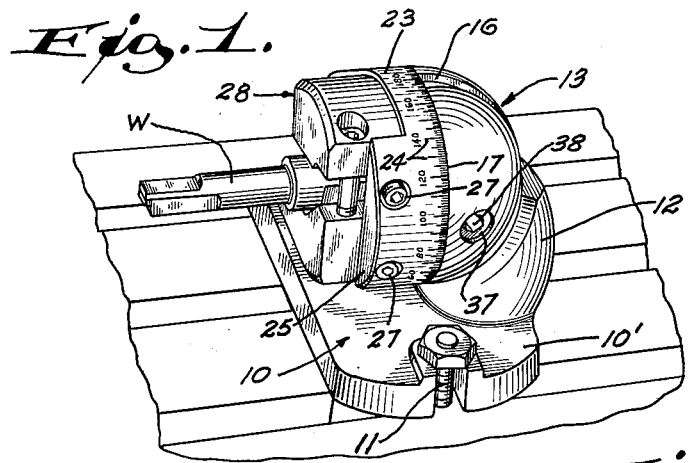
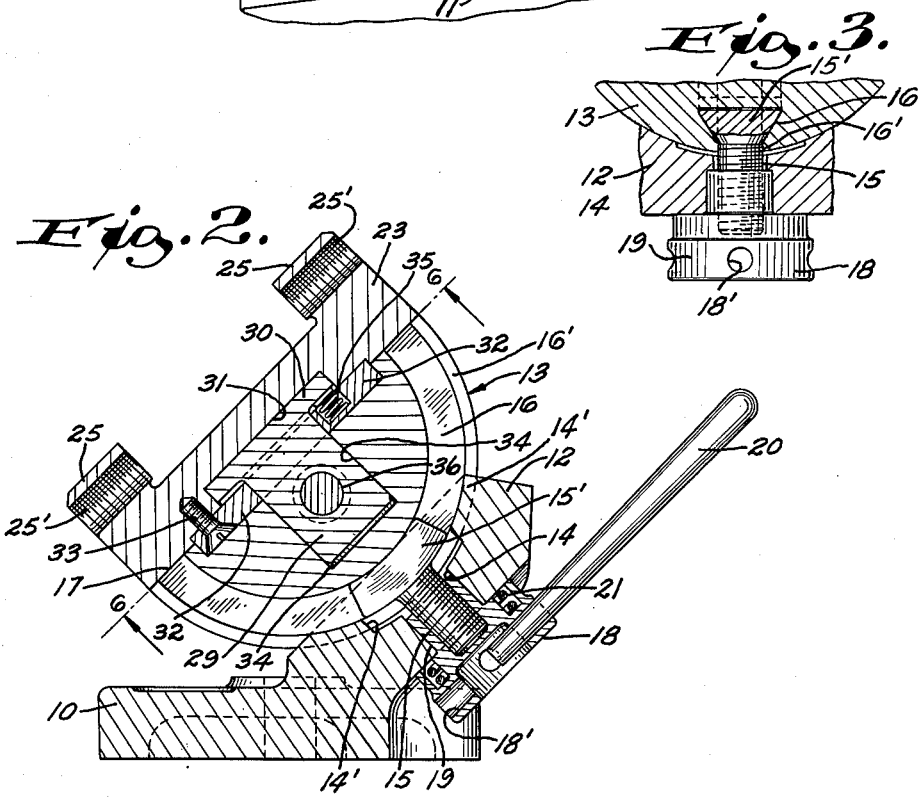
INVENTOR.
Frank C. Polanski
BY
Morsell & Morsell
ATTORNEYS

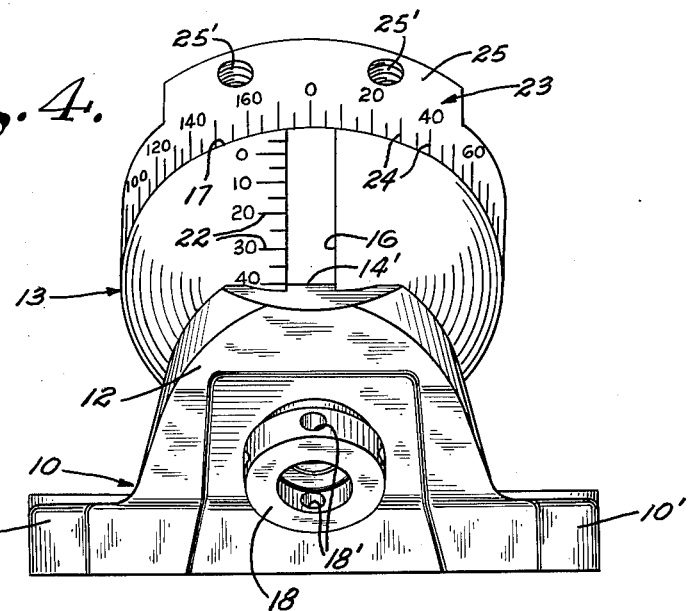
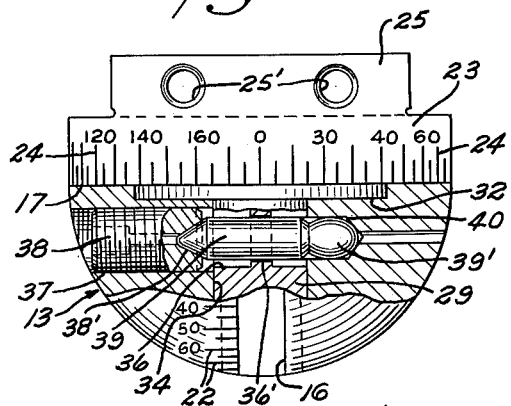
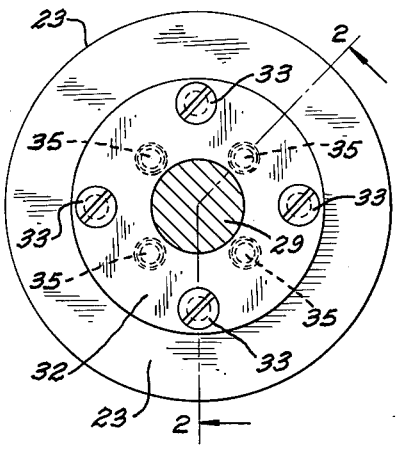
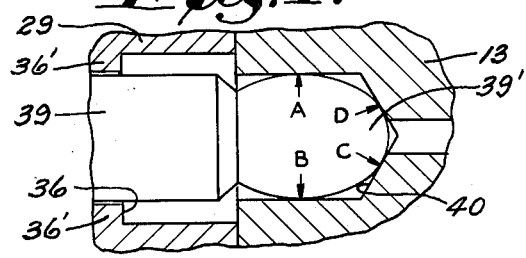

3,030,135
WORK HOLDERS
Frank C. Polanski, 4016 16th Ave., Kenosha, Wis.
Filed Oct. 13, 1958, Ser. No. 767,755
6 Claims. (Cl. 287—91)

This invention relates to improvements in work holders, and more particularly to an adjustable work holding device wherein the work may be positioned and maintained at any desired angle for precision drilling, grinding, milling, or the like.

A general object of the present invention is to provide a work holder having a pair of relatively movable members which co-operate to permit universal angular adjustment of the holder, and wherein said members have calibrations thereon so that the exact amount of adjustment may be easily and quickly determined by the operator.

A more specific object of the invention is to provide a work holder having a pair of movable members which may be independently adjusted and set, thus permitting one member to be moved to a desired angular position without disturbing the previously adjusted position of the other member.

A further specific object is to provide a work holder having a semi-spherical member adapted to be rocked in a vertical plane, said member having a novel clamping device whereby it may be quickly and easily locked in a selected position of adjustment.

A further specific object of the present invention is to provide a work holder having a disk portion swiveled on the face of said semi-sphere, said disk portion being adapted to be locked in position by a novel mechanism.

A still further object is to provide a compact work holder having a firm supporting base and having a minimum of overhang, such construction preventing the holder from tipping under pressure and also reducing vibration.

Other objects of the invention are to provide a universally adjustable work holder which is strong and durable, which is relatively simple in construction, and which may be economically manufactured.

With the above and other objects in view, the invention consists of the improved work holder, and all of its parts and combinations, as set forth in the claims, and all equivalents thereof.

In the drawing accompanying and forming a part of this specification, wherein is shown one complete embodiment of the preferred form of the invention, and wherein like reference characters indicate the same parts in all of the views:

FIG. 1 is a perspective view of the adjustable holder with a piece of work to be machined mounted therein, a part of a table top being shown;

FIG. 2 is a vertical sectional view of the work holder;

FIG. 3 is a fragmentary sectional view of the base and adjustable semi-sphere, showing the clamping device used to lock said semi-sphere in a selected position of adjustment;

FIG. 4 is a rear elevational view of the holder;

FIG. 5 is an elevational view of the semi-sphere, with a part being broken away to show the swivel disk locking mechanism;

FIG. 6 is a sectional view taken along line 6—6 of FIG. 2 and showing the bottom of the swivel disk; and FIG. 7 is an enlarged fragmentary sectional view of a portion of the swivel disk locking pin.

Referring now more particularly to the drawings, the numeral 10 designates the base of the work holder. Said base has laterally projecting wing portions 10' to provide a firm and stable foundation and is adapted to be secured to a work bench, as illustrated in FIG. 1, by means of bolts 11. Formed toward the rear of said base is an upwardly projecting back portion 12, the forward face of which is angled rearwardly upwardly at about a 45 degree angle (FIG. 2) and provided with a transverse opening 14 therethrough. The forward face of said back member has a spherically dished center portion to conform to the contour of the associated semi-sphere 13, as will be more fully described hereinafter, and there are keys 14' projecting therefrom, as shown in FIGS. 2 and 4.

The semi-sphere 13 is rockably secured to the back member 12 by means of a threaded bolt 15, the shank of said bolt being projected through the opening 14 in said back member and the sphere being guided in rocking movement by the fit of the keys 14' in the straight parallel side portions 16' of the groove 16 (see FIGS. 3 and 4). As will be seen in FIG. 2, the head portion 15' of said bolt is elongated and curved to conform to the curvature of a groove 16 with which it coacts. Said bolt head 15' is dovetailed in cross-section as shown in FIG. 3, as is the channel 16, and there may be relative sliding movement between the sphere and bolt head. Normally, the relatively loose fitting of the bolt head 15' within the channel 16 permits the semi-sphere to be rocked on its vertical axis through a range of 90 degrees, from a position where its face 17 is in a vertical plane (FIG. 1), to a position where said face is horizontal. In FIGS. 2 and 4, the semi-sphere is shown in a position approximately midway between the extremes just mentioned.

A nut 18 having internal threads, has a head 19 which abuts the rear of the back member 12, the end of the bolt shank 15 being engaged within said nut. The head 19 is provided with a plurality of peripheral openings 18' designed to removably receive a handle 20 (FIG. 2). When it is desired to lock the semi-sphere 13 in a certain position, the nut 18 may be turned, by means of the handle 20, to draw the bolt 15 inwardly. The semi-sphere may be thus drawn tightly into its spherical seat on the rigid back member 12, the clamping action taking place uniformly throughout all of the contacting area, thereby frictionally maintaining said semi-sphere against movement. As will be seen in FIG. 2, the nut 18 includes a coil spring 21 which normally urges the adjacent parts together when the clamping mechanism is loosened.

As shown in FIGS. 4 and 5, the semi-sphere 13 is provided with graduations or calibrations 22 adjacent the channel 16. Said graduations are numbered from 0 to 90, to represent the degrees the semi-sphere may be tilted, and may be easily read by the operator to determine the exact angular position of the semi-sphere face 17.

Mounted on the face 17 of the semi-sphere is a disk 23 which may be rotated 360 degrees. The periphery of said disk is provided with calibrations 24 to indicate the degrees of rotation, there being an index mark (not shown) suitably positioned on the semi-sphere adjacent said calibrations. The outer face of said disk 23 is provided with opposed projecting flanges 25 having a plurality of threaded openings 25' therethrough. As will be seen in FIG. 1, a chuck, vise or other holder 28 may be mounted on the disk and secured thereto by means of set screws 27 projected through said flange openings 25' or other suitable means. A piece of work, as for example the piece W in FIG. 1, may be readily inserted between the jaws of the vise 28 and presented to a machine tool for drilling, grinding or the like.

The co-operative action of the semi-sphere 13, which is rockable to permit its face 17 to be tilted to any angle between 0 and 90 degrees, with the rotatable disk 23 mounted on said face, provides a work holder which is universally adjustable relative to a machine tool. Moreover, the graduated scales 22 and 24 are clearly marked on said holder to permit an operator to quickly determine any combination of angles without reference to special measuring instruments.

The particular manner in which the rotatable disk 23 is mounted on the semi-sphere 13 is an important feature of the present invention and will now be described in greater detail. Referring to FIG. 2, the head 30 of an enlarged cylindrical stud 29 is rotatably maintained in a recess 31 in said disk by means of a ring 32 secured to the underside of said disk by screws 33. The shank of the stud 29 is positioned within a cylindrical well or bore 34 in the interior of the semi-sphere 13, said well being perpendicular to the semi-sphere face 17. As shown in FIG. 2, the stud 29 is free to move downwardly a short distance due to the fact that the well 34 is slightly longer than the stud. The latter characteristic is important in the operation of the locking mechanism, as will be more fully explained hereinafter.

The ring 32 has a plurality of springs 35 mounted in recesses thereon, in abutting relation with the underside of the stud head 30, the recess 31 being deeper than the thickness of the stud head. The springs normally tend to urge the disk into contact with the face of the semi-sphere even when it is not clamped. Thus the rotatable joint between the disk 23 and semi-sphere face is kept free of foreign matter.

Referring now to FIG. 5, a threaded transverse bore 37, extending from the outer surface of the semi-sphere and communicating with the aforementioned perpendicular well 34, carries a set screw 38, the inner end of said set screw having a conical recess 38' in its face. Projected through an enlarged opening 36 in the shank of the stud and loosely through a smaller hole in a web 36' formed in said stud shank opening is a pivotal pin 39, which pin is in alignment with the set screw 38 when in the position of FIG. 5. The tip of the pin 39 is conical in form to co-operate with the recess 38' in the end of said set screw, and the opposite end of said pin is provided with an elliptical head 39' which is positioned within a socket 40 formed in the semi-sphere.

As illustrated in FIG. 7, the socket 40 has a closed pointed inner end. The effect of this arrangement is to provide a four point contact at A, B, C and D between the socket and the head 39' of the pin, thus holding said head against displacement but providing a fulcrum about which the pin 39 may be pivoted, the points D and C taking the thrust of the screw 38.

When it is desired to lock the disk 23 in a selected rotated position, the set screw 38 may be turned (by means of a suitable wrench) so that it pushes inwardly against the tapered end of the pivot pin 39, the conical recess in the inner end of said set screw engaging the conical end of the pivot pin. As previously indicated, the socket 40 does not permit the pivot pin to move longitudinally. It has been seen, however, that the stud head 30 can be moved downwardly a short distance in the recess 31 against the tension of the springs 35 and that the bore 34 is deep enough to allow slightly greater axial movement of the stud 29. Consequently, when the set screw is urged against the slightly tipped up conical end of the pivot pin 39, the free end of said pin is urged downwardly toward the aligned position of FIG. 5 about the fulcrum provided by its head 39'. The resulting downward movement of said pivot pin causes a downward pull on the stud 29 through which it is projected, and which it loosely engages through the hole in the web 36' until its head contacts the ring 32. This then draws the disk 23 inwardly against the face 17 of the semi-sphere.

When the rotatable disk is thus drawn tightly against the face of the semi-sphere, said disk is frictionally maintained in its adjusted position and firmly locked against undesired movement. To release the disk, as when the work holder is to be set at a different angle, the set screw 38 is merely loosened to allow the springs 35 to urge the stud head 30 upwardly in the clearance space in recess 31, the pin 39 pivoting slightly on its fulcrum end 39' during such movement. The springs 35 always hold the mating parts in contact, when the screw 38 is loose, to prevent dust or chips from entering between surfaces.

From the foregoing, it will be appreciated that the locking mechanism employed in the present invention is not only novel but provides a structure which is unusually well adapted for its intended function. In addition to providing a device whereby the rotatable disk may be positively clamped in position, the adjustment of a single screw enables the operator to quickly and easily change the disk to a different setting. Moreover, even after wear occurs on the movable parts, the locking unit will still function effectively.

Although only one preferred form of the invention has been illustrated and described herein, it is to be understood that various changes and modifications may be made without departing from the spirit of the invention, and all of such changes are contemplated as may come within the scope of the following claims.

What I claim is:

1. In a joint having a first member with a face, there being a bore extending inwardly from said face, having a second member on said face of the first member and having a depending stud received in said bore, said second member being rotatable with respect to said stud, the improvement comprising said stud having a transverse opening, a transverse pin extending through said stud opening, means in said first member on one side of said bore pivotally receiving one end of said pin, and means on the opposite side of said bore for urging the opposite end of said pin in a direction to draw and lock the second member into frictional engagement with the face of the first member.

2. In a joint having a first member with a face, there being a bore extending inwardly from said face, having a second member on said face of the first member and having a depending stud received in said bore, said second member being rotatable with respect to said stud, the improvement comprising said stud having a transverse opening with an apertured web, a transverse pin extending through said stud opening and web, means in said first member on one side of said bore pivotally receiving one end of said pin, and means on the opposite side of said bore for urging the opposite end of said pin in a direction to pull on said web and draw the second member into frictional engagement with the face of the first member.

3. In a joint having a first member with a face, there being a bore extending inwardly from said face, having a second member on said face of said first member and having a depending stud received in said bore, said second member being rotatable with respect to said stud, the improvement comprising said stud having a transverse opening, a transverse pin extending through said stud opening, means in said first member on one side of said bore pivotally receiving one end of said pin, and a screw on the opposite side of said bore having tapered means engaging the opposite end of said pin to urge the latter in a direction to draw and lock the second member into frictional engagement with the face of the first member.

4. In a joint having a first member with a face, there being a bore extending inwardly from said face, having a second member on said face of said first member and having a depending stud received in said bore, said second member being rotatable with respect to said stud, the improvement comprising said stud having a transverse opening, a transverse pin extending through said stud opening, means in said first member on one side of said bore pivotally receiving one end of said pin, the other end of said pin being conical, and a transverse screw on the opposite side of said bore having a conical recess for receiving the conical end of said pin to urge the opposite end of said pin in a direction to draw the second member into frictional engagement with the face of the first member.

5. In a joint having a first member with a face, and having a rotatable second member on said face of the first member having a bottom recess, a depending stud having a head of less depth than said recess rotatably received in said recess whereby the second member is rotatable around said head, a stud retaining ring surrounding said stud below its head and attached to said second member for rotation therewith, spring means between said ring and head normally urging the head into its recess, said stud having a transverse opening, a transverse pin extending through said stud opening, means in said first member on one side of said bore pivotally receiving one end of said pin, and means on the opposite side of said bore engageable with the opposite end of said pin to urge the latter in a direction to draw the second member into frictional engagement with the face of the first member.

6. In a joint having a first member with a flat face having a circular recess, and having a rotatable second member on said face of the first member having a bottom circular recess, a depending stud having a circular head of less depth than the recess rotatably received in said recess whereby the second member is rotatable around said head, a stud retaining ring surrounding said stud below its head and attached to said second member for rotation therewith, said ring projecting into and fitting the circular recess in the upper face of the second member, spring means between said ring and head normally urging the head into its recess, said stud having a transverse opening, a transverse pin extending through said stud opening, means in said first member on one side of said bore pivotally receiving one end of said pin, and means on the opposite side of said bore engageable with the opposite end of said pin to urge the latter in a direction to draw the second member into frictional engagement with the face of the first member.

References Cited in the file of this patent

UNITED STATES PATENTS

| | | |
|---|---|---|
| 215,030 | Wallace | May 6, 1879 |
| 718,445 | Fliehmann | Jan. 13, 1903 |
| 1,574,187 | Crickmer | Feb. 23, 1926 |
| 1,677,889 | Gairing | July 24, 1928 |
| 2,378,912 | Collins | June 26, 1945 |
| 2,436,678 | Somers | Feb. 24, 1948 |
| 2,500,784 | Anderson | Mar. 14, 1950 |
| 2,521,230 | Larson | Sept. 5, 1950 |
| 2,534,432 | Frushour | Dec. 19, 1950 |
| 2,757,030 | Koppel | July 31, 1956 |
| 2,764,380 | Gumphrey | Sept. 25, 1956 |

FOREIGN PATENTS

| | | |
|---|---|---|
| 85,452 | Germany | Feb. 13, 1896 |